United States Patent
Schroeder et al.

(10) Patent No.: US 11,180,422 B2
(45) Date of Patent: Nov. 23, 2021

(54) VACUUM PRESSURE TRANSFORMATION VESSEL AND METHOD OF USE

(71) Applicant: Honda Motor Co., Ltd., Tokyo (JP)

(72) Inventors: Karl J. Schroeder, Columbus Grove, OH (US); Robert Craig De Neff, Bellefontaine, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 16/167,748

(22) Filed: Oct. 23, 2018

(65) Prior Publication Data

US 2020/0123072 A1 Apr. 23, 2020

(51) Int. Cl.
| | |
|---|---|
| C04B 41/51 | (2006.01) |
| C04B 35/71 | (2006.01) |
| B01J 3/03 | (2006.01) |
| B01J 3/00 | (2006.01) |
| B22D 18/04 | (2006.01) |

(52) U.S. Cl.
CPC ............... *C04B 41/51* (2013.01); *B01J 3/002* (2013.01); *B01J 3/006* (2013.01); *B01J 3/03* (2013.01); *C04B 35/71* (2013.01); *B01J 2219/002* (2013.01); *B01J 2219/00162* (2013.01); *B01J 2219/00182* (2013.01); *B22D 18/04* (2013.01); *C04B 2235/6581* (2013.01)

(58) Field of Classification Search
CPC ........ B22D 2/003; B22D 18/08; B22D 19/02; B22D 18/04; B22D 18/06; C23C 2/00; C23C 2/003; C04B 41/51
See application file for complete search history.

(56) References Cited

U.S. PATENT DOCUMENTS

| | | | |
|---|---|---|---|
| 3,705,615 A | | 12/1972 | Watts |
| 5,477,907 A | * | 12/1995 | Meyer .................... B22D 39/06 |
| | | | 164/133 |
| 6,360,809 B1 | | 3/2002 | Cornie et al. |
| 9,376,739 B2 | | 6/2016 | Kulakovsky |
| 9,636,743 B2 | | 5/2017 | Mochizuki et al. |

(Continued)

FOREIGN PATENT DOCUMENTS

| | | | | |
|---|---|---|---|---|
| CH | 634495 A5 | * | 2/1983 | ............. B22D 18/04 |
| CN | 202684050 U | | 1/2013 | |

(Continued)

*Primary Examiner* — Kevin E Yoon
*Assistant Examiner* — Jacky Yuen
(74) *Attorney, Agent, or Firm* — Armstrong Teasdale LLP

(57) ABSTRACT

A method of forming a ceramic-metal composite part is described herein. The method includes maintaining molten metal in an interior of a housing in a liquefied state, the interior including a first chamber, a second chamber, and a port defined therebetween. The method further includes sealing the port such that the molten metal in the first chamber is maintained at a first liquid level, suspending a part at a height within the first chamber above the first liquid level, forming a pressure differential between the first chamber and the second chamber, unsealing the port such that molten metal from the second chamber flows into the first chamber, and resealing the port when the molten metal in the first chamber reaches a second liquid level such that the ceramic part is submerged in the molten metal.

17 Claims, 6 Drawing Sheets

(56) References Cited

U.S. PATENT DOCUMENTS

2002/0024173 A1* 2/2002 Scriven ................. B22D 41/00
266/236
2010/0108285 A1* 5/2010 Mizuno ................. B22D 18/04
164/457

FOREIGN PATENT DOCUMENTS

CN 204449266 U 7/2015
KR 101888187 B1 * 8/2018

* cited by examiner

VACUUM PRESSURE TRANSFORMATION VESSEL AND METHOD OF USE

BACKGROUND

The field of the present disclosure relates generally to ceramic-metal composites and, more specifically, to systems and methods for use in forming ceramic-metal composites.

Ceramic matrix composites (CMCs) are generally formed from a continuous reinforcing phase (i.e., ceramic and/or carbon fibers) embedded in a ceramic phase (i.e., a matrix material). Resulting CMC parts have desirable physical properties such as, but not limited to, high-temperature stability, high thermal-shock resistance, high hardness, high corrosion resistance, and/or nonmagnetic and nonconductive properties. However, CMC parts may also be brittle and susceptible to damage from high impact forces.

One known method of improving the durability of CMC parts is through a process referred to as transformation. Transformation generally includes infusing a CMC part with metal. At least some known transformation processes are performed in a furnace that contains a bath of molten metal in which the CMC part is submerged. For example, the furnace is filled with an amount of molten metal, and a transfer device attached to the furnace enables a CMC part to be loaded into the furnace. Once positioned within the furnace, the CMC part is positioned above the molten metal and a vacuum is drawn to facilitate removing air from the pores of the CMC part. The CMC part is then moved towards the bath by the transfer device for submersion within the molten metal. At least some known transfer devices include a plurality of independent moving parts that may result in formation of a leakage flow path from the furnace when the furnace is highly pressurized. In such cases, the effectiveness of the air removal step may be limited, thereby reducing the effectiveness of metal infusion into the CMC part.

BRIEF DESCRIPTION

In one aspect, a method of forming a ceramic-metal composite part is provided. The method includes maintaining molten metal in an interior of a housing in a liquefied state, the interior including a first chamber, a second chamber, and a port configured to provide flow communication between the first chamber and the second chamber. The method further includes sealing the port such that the molten metal in the first chamber is maintained at a first liquid level, suspending a ceramic part at a predetermined height within the first chamber above the first liquid level, forming a pressure differential between the first chamber and the second chamber such that a first pressure within the first chamber is less than a second pressure within the second chamber, unsealing the port such that molten metal from the second chamber flows into the first chamber, and resealing the port when the molten metal in the first chamber reaches a second liquid level, wherein the ceramic part is submerged in the molten metal at the second liquid level.

In another aspect, a vacuum pressure vessel is provided. The vessel includes a housing having an interior that includes a first chamber, a second chamber, and a port configured to provide selective flow communication between the first chamber and the second chamber. A part holder is selectively coupled to the housing. The part holder is configured to suspend a part at a predetermined height within the first chamber. A stopper is configured to selectively seal the port such that a liquid level in the first chamber and the second chamber is maintained when the port is sealed, and such that the liquid level in the first chamber and the second chamber is adjustable when the port is unsealed and a pressure differential is defined therebetween.

In yet another aspect, a vacuum pressure vessel system is provided. The system includes a vacuum pressure vessel that includes a housing having an interior that includes a first chamber, a second chamber, and a port configured to provide selective flow communication between the first chamber and the second chamber. The vessel includes a heating system configured to maintain molten metal in the interior in a liquefied state. A part holder is selectively coupled to the housing. The part holder is configured to suspend a part at a predetermined height within the first chamber. A stopper is configured to selectively seal the port such that a liquid level in the first chamber and the second chamber is maintained when the port is sealed, and such that the liquid level in the first chamber and the second chamber is adjustable when the port is unsealed and a pressure differential is defined therebetween. The system further includes a pressurization device in flow communication with the interior, wherein the pressurization device is configured to adjust a pressure within the first chamber and the second chamber. A controller is in communication with the stopper and the pressurization device, wherein the controller is configured to selectively actuate the stopper and the pressurization device for controlling operation of the vacuum pressure vessel system.

DETAILED DESCRIPTION

The embodiments described herein relate generally to systems and methods for use in forming ceramic-metal composites. More specifically, the systems described herein include a housing having a first chamber, a second chamber, and a port that provides flow communication therebetween. A stopper selectively seals the port to facilitate either maintaining or adjusting a liquid level of molten metal in the first chamber or the second chamber. For example, during operation, a part holder suspends a ceramic part within the first chamber above the liquid level therein. A pressure differential is then formed between the first chamber and the second chamber, and the port is unsealed such that molten metal from the second chambers flows into the first chamber. The port is resealed when the molten metal in the first chamber reaches a level in which the ceramic part is submerged in the molten metal. As such, the ceramic part is submerged in the molten metal without the use of a translating mechanical device, thus increasing the ability of the housing to be sealed and to effectively hold positive and negative pressures during a transformation cycle. As a result, a ceramic-metal composite part may be formed with improved mechanical properties.

As used herein, an element or step recited in the singular and preceded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
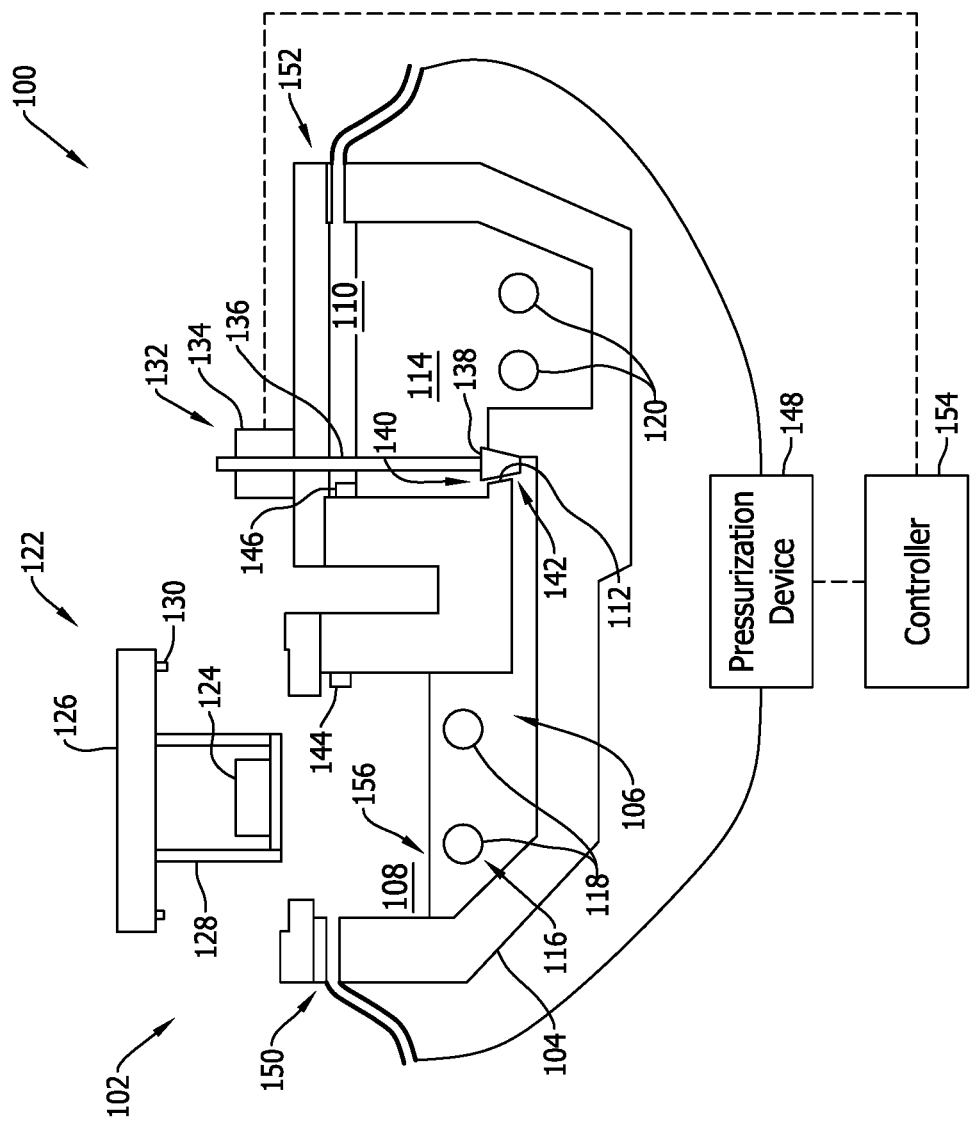
FIG. 1 is a schematic illustration of an exemplary vacuum pressure vessel system.

FIG. 1 is a schematic illustration of an exemplary vacuum pressure vessel system 100. In the exemplary embodiment, system 100 includes a vacuum pressure vessel 102 including a housing 104. Housing 104 includes an interior 106 including a first chamber 108, a second chamber 110, and a port 112 that provides selective flow communication between first chamber 108 and second chamber 110. Interior 106 contains a bath 114 of molten metal therein. The molten metal may be formed from any metallic material that enables system 100 to function as described herein. An example molten metal includes, but is not limited to, molten aluminum.

A heating system 116 is included in interior 106. Heating system 116 maintains bath 114 of molten metal in interior 106 in a liquefied state. For example, heating system 116 includes a first heater 118 positioned in first chamber 108, and a second heater 120 positioned in second chamber 110. First heater 118 and second heater 120 are submerged within bath 114 of molten metal to facilitate maintaining bath 114 in the liquefied state. In at least one example, heating system 116 is configured to maintain the molten metal at a temperature greater than approximately 1100 degrees Celsius.

In the exemplary embodiment, a part holder 122 is selectively coupled to housing 104. That is, part holder 122 is configured to couple to housing 104, and is also configured for removal from housing 104. Part holder 122 suspends a part 124 at a predetermined height within first chamber 108. For example, part holder 122 includes a lid 126 and a holding member 128 statically affixed (i.e., non-translatable) to lid 126. Lid 126 is configured for coupling to housing 104 with an air tight seal such that housing 104 remains sealed during one or more pressurization cycles of a transformation cycle, as will be described in more detail below. For example, in one embodiment, part holder 122 further includes a gasket 130 coupled to lid 126 to facilitate sealing housing 104 when lid 126 is coupled thereto. Part holder 122 may also include a locking mechanism (not shown in FIG. 1) that interacts with a corresponding portion of housing 104 to maintain the air tight seal when the pressure within first chamber 108 is increased. Holding member 128 may be any mechanical device that enables part holder 122 to function as described herein. Example holding members include, but are not limited to, a porous basket or a hook. As such, holding member 128 enables bath 114 of molten metal to contact part 124 during a transformation cycle, as will be described in more detail below.

Part 124 may be fabricated from any material that enables system 100 to function as described herein. In the exemplary embodiment, part 124 is fabricated from a ceramic material such as, but not limited to, silicon carbide, aluminum oxide, silicon nitride, and/or aluminum nitride. As noted above, ceramic material is generally porous. As such, contacting part 124 with molten metal under predetermined process conditions results in formation of a ceramic-metal composite.

In the exemplary embodiment, vacuum pressure vessel 102 further includes a stopper 132 that is positionable for selectively sealing port 112. Stopper 132 may be actuated manually by an operator, or may be actuated in an automated manner. For example, in one embodiment, stopper 132 includes a motor 134 and a sealing member 136. Motor 134 is operable to facilitate translating sealing member 136 relative to motor 134 for selectively sealing port 112. A liquid level in first chamber 108 and second chamber 110 is maintained when port 112 is sealed by stopper 132. Alternatively, the liquid level in first chamber 108 and second chamber 110 is adjusted when port 112 is unsealed and a pressure differential is defined between first chamber 108 and second chamber 110.

In one embodiment, sealing member 136 includes a plug head 138 formed at a distal end thereof. Plug head 138 is shaped to correspond to a shape of port 112. For example, in the exemplary embodiment, port 112 includes a first opening 140 proximal to second chamber 110, and a second opening 142 proximal to first chamber 108. First opening 140 is sized larger than second opening 142 such that port 112 is formed with a tapered cross-sectional profile. Thus, plug head 138 has a tapered profile that enables plug head 138 to be securely seated within port 112, and the tapered cross-sectional profile of port 112 facilitates controlling the flow of molten metal from second chamber 110 to first chamber 108 when plug head 138 is lifted to unseal port 112.

In the exemplary embodiment, a first sensor 144 is coupled within first chamber 108, and a second sensor 146 is coupled within second chamber 110. First sensor 144 and second sensor 146 monitor the liquid levels in first chamber 108 and second chamber 110. For example, first sensor 144 monitors the liquid level in first chamber 108 to ensure part 124 is submerged in bath 114 of molten metal during performance of a transformation cycle. First sensor 144 and second sensor 146 may be any contact or non-contact sensors that enable system 100 to function as described herein.

System 100 further includes a pressurization device 148 in flow communication with interior 106. For example, housing 104 includes a first pressure port 150 and a second pressure port 152 defined therein. First pressure port 150 provides flow communication between pressurization device 148 and first chamber 108, and is positioned to enable pressurization of first chamber 108 independently of second chamber 110 when port 112 is sealed. Second pressure port 152 provides flow communication between pressurization device 148 and second chamber 110, and is positioned to enable pressurization of second chamber 110 independently of first chamber 108 when port 112 is sealed. Pressurization device 148 is capable of forming a negative pressure or a positive pressure within first chamber 108 and second chamber 110. In addition, pressurization device 148 is capable of forming a negative pressure in first chamber 108 and a positive pressure in second chamber 110 simultaneously, or vice versa. As such, pressurization device 148 facilitates forming a pressure differential between first chamber 108 and second chamber 110 to facilitate selectively adjusting the liquid level heights in each chamber 108 and 110. In at least one embodiment, pressurization device 148 is configured to create a negative pressure defined within a range between about 0 kPa and −200 kPa, between about −50 kPa and about −150 kPa, or approximately −100 kPa within first chamber 108 and/or second chamber 110. Moreover, pressurization device 148 is configured to create a positive pressure defined within a range between about 100 kPa and about 1000 kPa, between about 500 kPa and about 1000 kPa, or approximately 700 kPa within first chamber 108 and/or second chamber 110. Alternatively, the negative pressure and the positive pressure may be any pressures that enable system 100 to function as described herein.

System 100 further includes a controller 154 for automatically controlling operation of system 100. Controller 154 includes a memory and a processor, comprising hardware and software, coupled to the memory for executing programmed instructions. The processor may include one or more processing units (e.g., in a multi-core configuration) and/or include a cryptographic accelerator (not shown). Controller 154 is programmable to perform one or more operations described herein by programming the memory and/or processor. For example, the processor may be programmed by encoding an operation as executable instructions and providing the executable instructions in the memory.

The processor may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by the processor, cause the processor to perform at least a portion of the functions described herein. The above examples are exemplary only, and thus are not intended to limit in any way the definition and/or meaning of the term processor.

The memory is one or more devices that enable information such as executable instructions and/or other data to be stored and retrieved. The memory may include one or more computer-readable media, such as, without limitation, dynamic random access memory (DRAM), synchronous dynamic random access memory (SDRAM), static random access memory (SRAM), a solid state disk, and/or a hard disk. The memory may be configured to store, without limitation, executable instructions, operating systems, applications, resources, installation scripts and/or any other type of data suitable for use with the methods and systems described herein.

Instructions for operating systems and applications are located in a functional form on non-transitory memory for execution by the processor to perform one or more of the processes described herein. These instructions in the different implementations may be embodied on different physical or tangible computer-readable media, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 154 to permit access and/or execution by the processor. In an alternative implementation, the computer-readable media is not removable.

Controller 154 is coupled, either by wired or wirelessly connectivity, in communication with one or more of heating system 116, stopper 132, pressurization device 148, first and second sensors 144 and 146, and part holder 122. In one implementation, controller 154 is autonomously operated when controlling the devices listed above for controlling operation of system 100 during performance of a transformation cycle. Alternatively, controller 154 is partially autonomous such that controller 154 can receive commands or other inputs from an operator during performance of the transformation cycle.

FIGS. 1-5 are schematic illustrations of vacuum pressure vessel system 100 in various modes of operation. Referring to FIG. 1, system 100 is in a state of equilibrium. To reach the state of equilibrium, heating system 116 is operable to maintain bath 114 of molten metal in interior 106 of housing 104 in a liquefied state. In addition, pressurization device 148 is operable to form a pressure differential in interior 106 that facilitates adjusting a liquid level of molten metal in first chamber 108 to be at a first liquid level 156. Stopper 132 seals port 112 to facilitate maintaining the molten metal at first liquid level 156. Part 124 is loaded into part holder 122, and part holder 122 is then positioned for coupling to housing 104.

Figure 2:
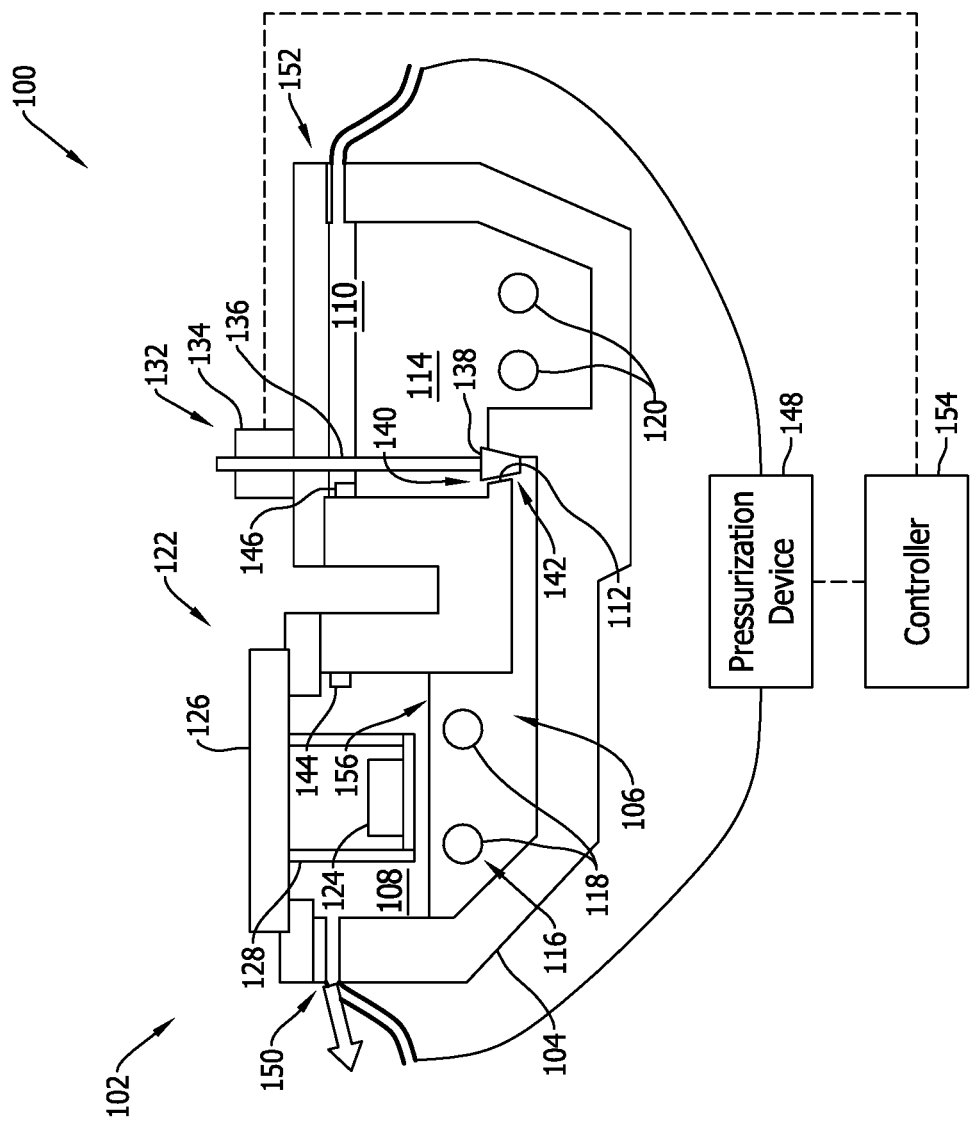
FIG. 2 is a schematic illustration of the vacuum pressure vessel system in a first mode of operation.

For example, referring to FIG. 2, lid 126 is coupled to housing 104 with an air tight seal. When lid 126 is coupled to housing 104, part 124 is suspended at a predetermined height within first chamber 108 at a position above first liquid level 156. As noted above, holding member 128 is statically affixed to lid 126. As such, a length of holding member 128 is selected to facilitate suspending part 124 at the predetermined height within first chamber 108.

Once housing 104 is sealed, pressurization device 148 is operable to form a pressure differential between first chamber 108 and second chamber 110 such that a first pressure within first chamber 108 is less than a second pressure within second chamber 110. More specifically, pressurization device 148 facilitates drawing a vacuum in first chamber 108, which is sealed by lid 126 and plug head 138, and holding the vacuum in first chamber 108 for a predetermined duration. As such, air is removed from within first chamber 108 and from within the intermolecular structure of part 124.

Figure 3:
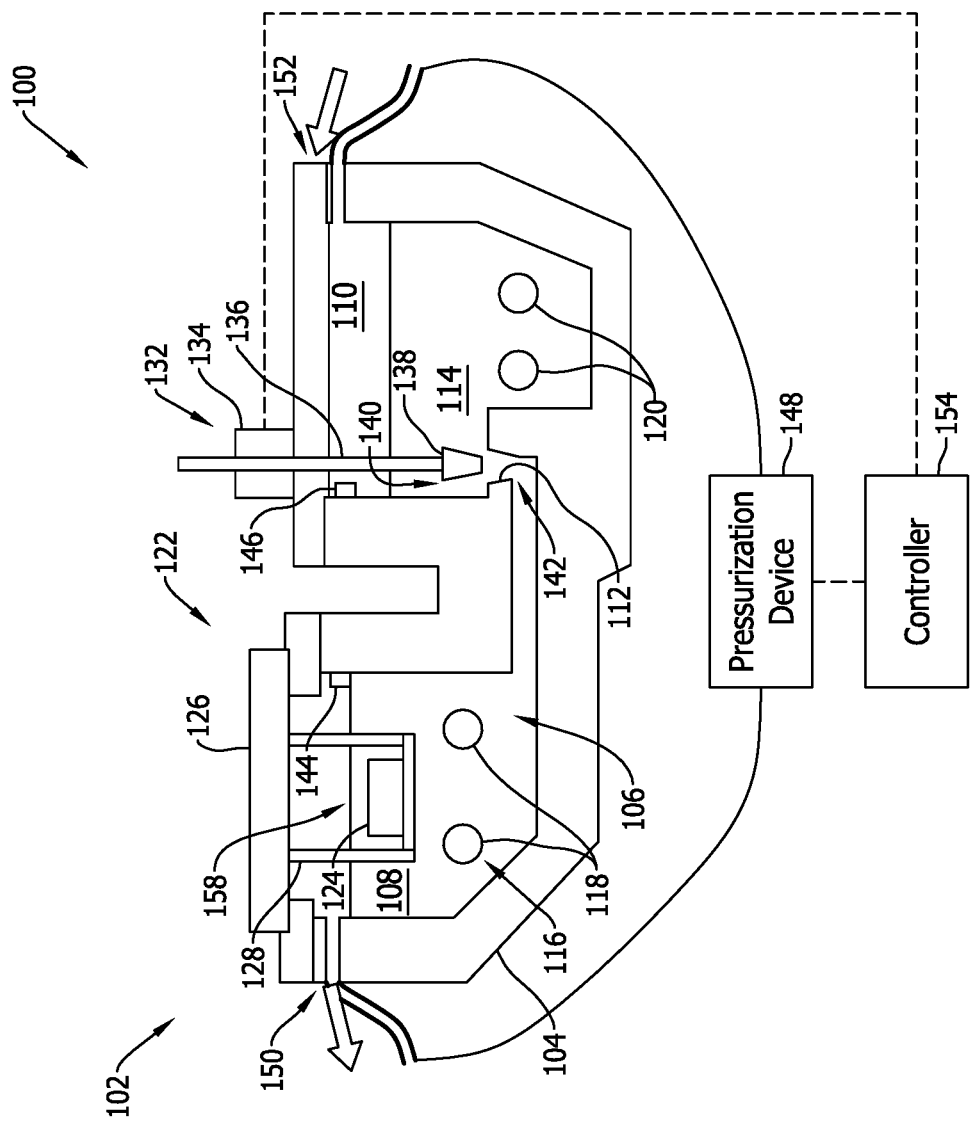
FIG. 3 is a schematic illustration of the vacuum pressure vessel system in a second mode of operation.

Referring to FIG. 3, port 112 is unsealed by removing plug head 138 therefrom such that molten metal from second chamber 110 flows into first chamber 108. The molten metal flows from second chamber 110 into first chamber 108 by virtue of the pressure differential created by pressurization system when the vacuum is created in first chamber 108. In some embodiments, an additional vacuum is drawn in first chamber 108 and/or second chamber 110 is pressurized to an elevated pressure to ensure the molten metal in first chamber 108 reaches a second liquid level 158 in which part 124 is submerged in the molten metal.

Figure 4:
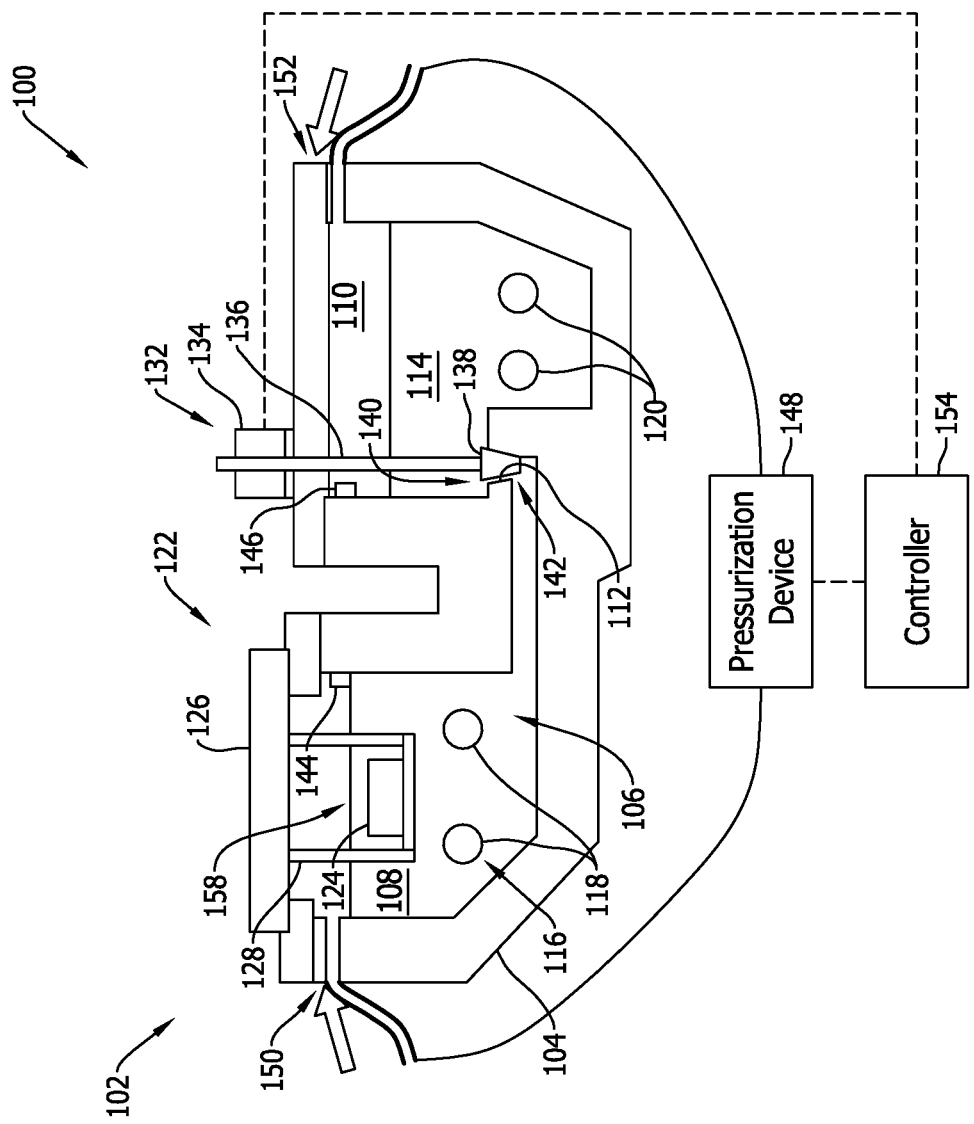
FIG. 4 is a schematic illustration of the vacuum pressure vessel system in a third mode of operation.

Referring to FIG. 4, port 112 is resealed when the molten metal reaches second liquid level 158. Pressurization device 148 then pressurizes first chamber 108 to an elevated pressure after port 112 is resealed, and maintains first chamber 108 at the elevated pressure for a predetermined duration. As such, the molten metal infiltrates the intermolecular structure of part 124. In one embodiment, pressurization device 148 pressurizes second chamber 110 when first chamber 108 is at the elevated pressure. For example, second chamber 110 may be pressurized to an elevated pressure that is substantially equal to the pressure within first chamber 108, or may be pressurized such that a pressure differential between first chamber 108 and second chamber 110 is less than a predetermined threshold. As such, the pressure within interior 106 is substantially equalized to facilitate maintaining the seal across port 112.

Figure 5:
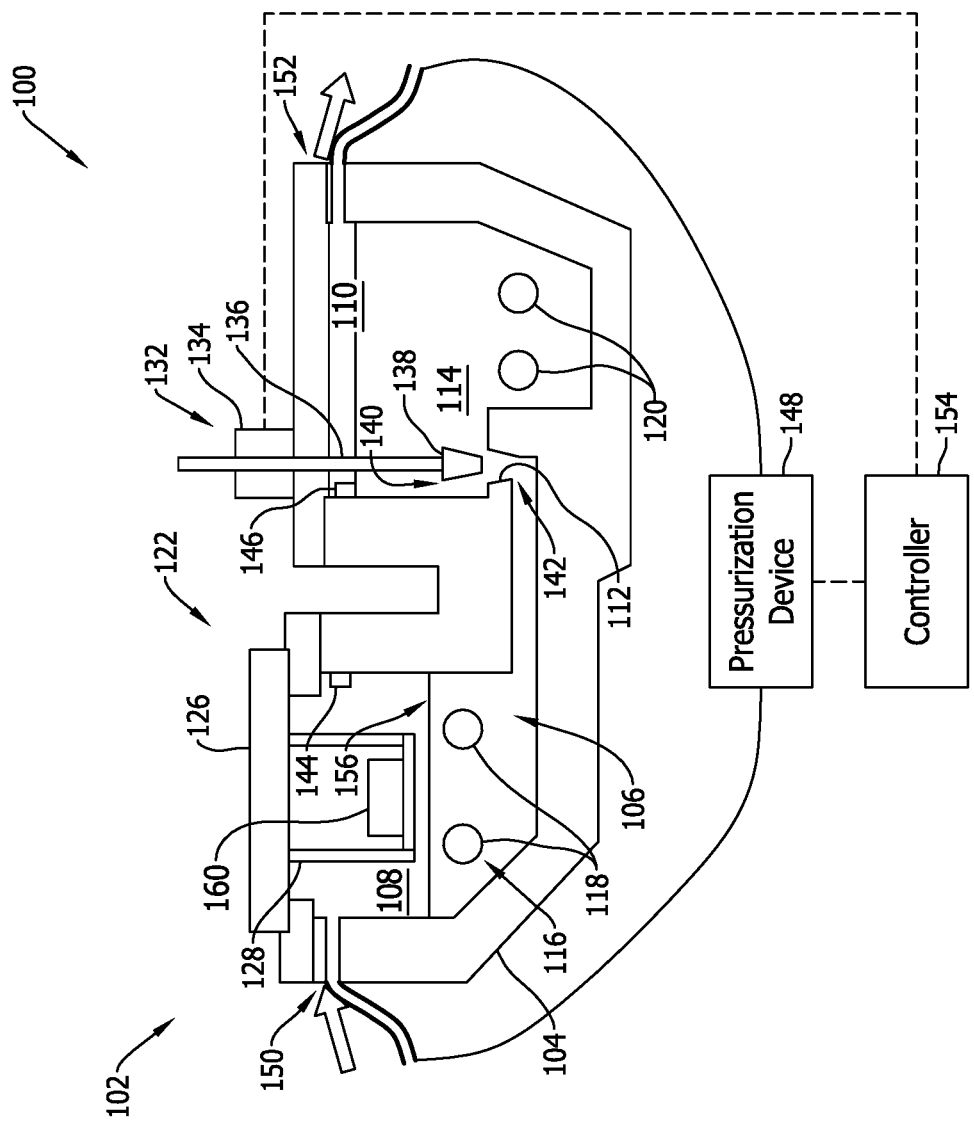
FIG. 5 is a schematic illustration of the vacuum pressure vessel system in a fourth mode of operation.

Referring to FIG. 5, port 112 is unsealed after the predetermined duration has elapsed. Prior to unsealing port 112, pressurization device 148 is controlled to create a pressure differential between first chamber 108 and second chamber 110 such that the first pressure within first chamber 108 is greater than the second pressure within second chamber 110. Once port 112 is unsealed, molten metal from first chamber 108 flows into second chamber 110. Port 112 is then resealed when the molten metal in first chamber 108 returns to at least first liquid level 156, as determined by either first sensor 144 or by second sensor 146 determining a liquid level in second chamber 110. Alternatively, port 112 is resealed when the liquid level in first chamber 108 falls below the suspension height of part 124 (shown in FIG. 4). With the transformation cycle complete, part 124 is converted to a ceramic-metal composite part 160. Part holder 122 may then be uncoupled from housing 104 and ceramic-metal composite part 160 removed therefrom.

Figure 6:
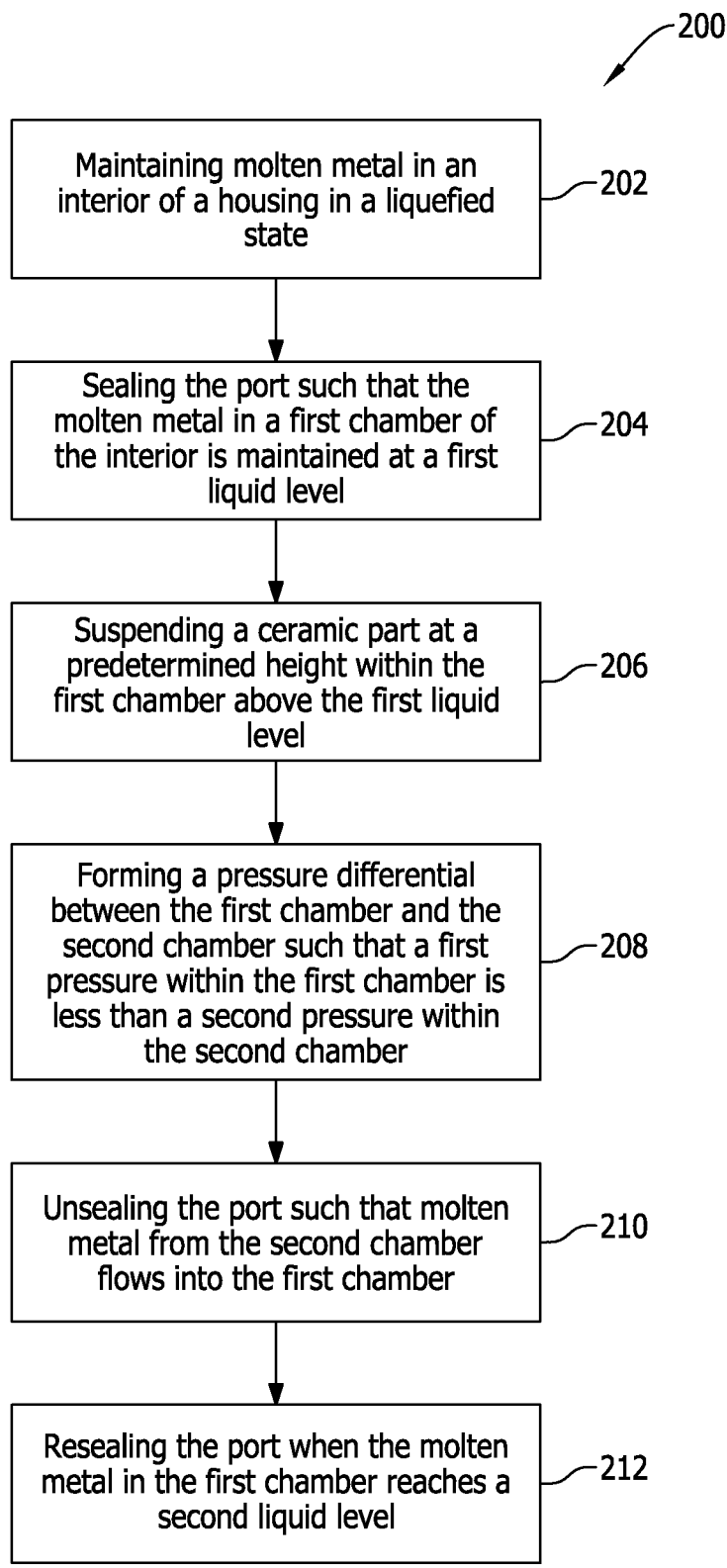
FIG. 6 is a flow diagram illustrating an exemplary method of forming a ceramic-metal composite part.

FIG. 6 is a flow diagram illustrating an exemplary method 200 of forming ceramic-metal composite part 160 using, for example, system 100. Method 200 includes maintaining 202 molten metal in interior 106 of housing 104 in a liquefied state, sealing 204 port 112 such that the molten metal in first chamber 108 is maintained at a first liquid level, suspending 206 a ceramic part 124 at a predetermined height within first chamber 108 above the first liquid level, forming 208 a pressure differential between first chamber 108 and second chamber 110 such that a first pressure within first chamber 108 is less than a second pressure within second chamber 110, unsealing 210 port 112 such that molten metal from second chamber 110 flows into first chamber 108, and resealing 212 port 112 when the molten metal in first chamber 108 reaches a second liquid level, wherein ceramic part 124 is submerged in the molten metal at the second liquid level.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a ceramic-metal composite part, the method comprising:
    maintaining molten metal in an interior of a housing in a liquefied state using a heating system, the interior including a first chamber, a second chamber, and a port configured to provide flow communication between the first chamber and the second chamber;
    sealing the port by actuating a stopper with a controller in communication with the stopper such that the molten metal in the first chamber is maintained at a first liquid level;
    suspending a ceramic part at a predetermined height within the first chamber above the first liquid level using a part holder selectively coupled to the housing, the part holder including a lid and a holding member statically affixed to the lid and suspended a fixed distance below the lid, wherein the holding member comprises at least one of a porous basket and a hook;
    forming a pressure differential between the first chamber and the second chamber by actuating a pressurization device with the controller such that a first pressure within the first chamber is less than a second pressure within the second chamber;
    unsealing the port by actuating the stopper with the controller such that molten metal from the second chamber flows into the first chamber;
    resealing the port when the molten metal in the first chamber reaches a second liquid level by actuating the stopper with the controller, wherein the ceramic part is submerged in the molten metal at the second liquid level;
    forming a pressure differential between the first chamber and the second chamber by actuating the pressurization device with the controller after the port is resealed such that the first pressure within the first chamber is greater than the second pressure within the second chamber;
    unsealing the port by actuating the stopper with the controller such that molten metal from the first chamber flows into the second chamber; and
    resealing the port by actuating the stopper with the controller when the molten metal in the first chamber is below the predetermined height.

2. The method in accordance with claim 1, wherein forming a pressure differential comprises:
    drawing a vacuum in the first chamber;
    sealing the ceramic part in the first chamber; and
    maintaining the vacuum in the first chamber for a predetermined duration.

3. The method in accordance with claim 1 further comprising:
    pressurizing the first chamber to increase the pressure therein after resealing the port when the molten metal in the first chamber reaches a second liquid level; and
    maintaining the first chamber at the increased pressure for a predetermined duration.

4. The method in accordance with claim 3 further comprising pressurizing the second chamber when the first chamber is at the increased pressure such that a pressure differential between the first chamber and the second chamber is less than a predetermined threshold.

5. The method in accordance with claim 1, wherein suspending a ceramic part comprises:
    coupling the ceramic part to the holding member; and
    coupling the lid to the housing.

6. The method in accordance with claim 5, wherein coupling the lid to the housing comprises forming an air tight seal between the housing and the lid.

7. A vacuum pressure vessel comprising:
    a housing comprising an interior that comprises a first chamber, a second chamber, and a port configured to provide selective flow communication between the first chamber and the second chamber;
    a part holder selectively coupled to the housing, the part holder comprising:
        a lid; and
        a holding member statically affixed to the lid and suspended a fixed distance below the lid to suspend a part at a predetermined height within the first chamber, wherein the holding member comprises at least one of a porous basket and a hook;
    a stopper configured to selectively seal the port such that a liquid level in the first chamber and the second chamber is maintained when the port is sealed, and such that the liquid level in the first chamber and the second chamber is adjustable when the port is unsealed and a pressure differential is defined therebetween; and
    a pressurization device in flow communication with the interior and configured to adjust a pressure within the first chamber and the second chamber, wherein the stopper and the pressurization device are cooperatively configured to transfer molten metal from the second chamber into the first chamber such that a liquid level of molten metal within the first chamber is above the predetermined height and, subsequently, transfer molten metal from the first chamber into the second chamber such that the liquid level of molten metal within the first chamber is below the predetermined height.

8. The vessel in accordance with claim 7, wherein the housing further comprises a first pressure port configured to provide flow communication between the first chamber and the pressurization device, the first pressure port positioned to enable pressurization of the first chamber independently of the second chamber.

9. The vessel in accordance with claim 8, wherein the housing further comprises a second pressure port configured to provide flow communication between the second chamber and the pressurization device, the second pressure port positioned to enable pressurization of the second chamber independently of the first chamber.

10. The vessel in accordance with claim 7, wherein the lid is configured to couple to the housing with an air tight seal.

11. The vessel in accordance with claim 7 further comprising a heating system comprising a first heater positioned in the first chamber, and a second heater positioned in the second chamber, wherein the heating system is configured to maintain molten metal in the interior in a liquefied state.

12. A vacuum pressure vessel system comprising:
a vacuum pressure vessel comprising:
a housing comprising an interior that comprises a first chamber, a second chamber, and a port configured to provide selective flow communication between the first chamber and the second chamber;
a heating system configured to maintain molten metal in the interior in a liquefied state;
a part holder selectively coupled to the housing, the part holder comprising:
a lid; and
a holding member statically affixed to the lid and suspended a fixed distance below the lid to suspend a part at a predetermined height within the first chamber, wherein the holding member comprises at least one of a porous basket and a hook; and
a stopper configured to selectively seal the port such that a liquid level in the first chamber and the second chamber is maintained when the port is sealed, and such that the liquid level in the first chamber and the second chamber is adjustable when the port is unsealed and a pressure differential is defined therebetween;
a pressurization device in flow communication with the interior, wherein the pressurization device is configured to adjust a pressure within the first chamber and the second chamber; and
a controller in communication with the stopper and the pressurization device, wherein the controller is configured to selectively actuate the stopper and the pressurization device to:
seal the port such that molten metal in the first chamber is maintained at a first liquid level below the predetermined height;
form a pressure differential between the first chamber and the second chamber such that a first pressure within the first chamber is less than a second pressure within the second chamber;
unseal the port such that molten metal from the second chamber flows into the first chamber;
reseal the port when the molten metal in the first chamber reaches a second liquid level above the predetermined height;
form a pressure differential between the first chamber and the second chamber after the port is resealed such that the first pressure within the first chamber is greater than the second pressure within the second chamber;
unseal the port such that molten metal from the first chamber flows into the second chamber; and
reseal the port when the liquid level of the molten metal in the first chamber is below the predetermined height.

13. The system in accordance with claim 12, wherein the housing further comprises a first pressure port configured to provide flow communication between the first chamber and the pressurization device, the first pressure port positioned to enable pressurization of the first chamber independently of the second chamber.

14. The system in accordance with claim 13, wherein the housing further comprises a second pressure port configured to provide flow communication between the second chamber and the pressurization device, the second pressure port positioned to enable pressurization of the second chamber independently of the first chamber.

15. The system in accordance with claim 12, wherein the heating system comprises a first heater positioned in the first chamber, and a second heater positioned in the second chamber.

16. The system in accordance with claim 12 further comprising a first sensor configured to monitor the liquid level in the first chamber, and a second sensor configured to monitor the liquid level in the second chamber.

17. The system in accordance with claim 16, wherein the controller is in communication with the first sensor and the second sensor, the controller configured to selectively actuate the stopper and the pressurization device based on feedback received from the first sensor and the second sensor.

* * * * *